Patented Oct. 22, 1935

2,017,930

UNITED STATES PATENT OFFICE 2,017,930

PURIFICATION OF ZINC SALT SOLUTIONS

Leon R. Westbrook, Cleveland Heights, Ohio, assignor to The Grasselli Chemical Company, Cleveland, Ohio, a corporation of Delaware No Drawing. Application February 10, 1932, Serial No. 592,191

6 Claims. (Cl. 23—125)

The present invention relates to treatments of aqueous solutions of zinc salts for the removal of alkali metal compounds therefrom.

In the manufacture of zinc sulfate, zinc chloride or other soluble zinc salts from a variety of zinc bearing materials, there are produced liquors which are more or less contaminated with various salts, the cations of which are present in the crudes or introduced in certain steps of the operations.

Salts of heavy metals and of alkaline earth metals can easily be eliminated by known processes but up to the present it has been practically impossible to substantially reduce the alkali metal content of zinc salt solutions.

When zinc sulfate solutions, for instance, are concentrated and zinc sulfate allowed to crystallize therefrom, the sodium or other alkali metal salts which may be present accumulate in the mother liquors until they interfere with the crystallization and contaminate the product.

Similarly, in processes where zinc sulfate, zinc chloride, etc. solutions are evaporated to dryness, the resulting zinc salts are contaminated with the full amount of alkali metal salts present in the original liquors.

I have found that alkali metal fluosilicates are sparingly soluble in zinc salt solutions and that the addition of hydrofluosilicic acid or soluble fluosilicates to zinc salt solutions containing alkali metal compounds will precipitate alkali metal fluosilicates which are then eliminated from the zinc salt solutions by filtration or equivalent mechanical operations and my invention comprises adding a compound containing the fluosilicate radical to a zinc salt solution and separating the precipitated alkali metal fluosilicate from the zinc salt solution.

Alkaline earth metal salts are, of course, not present in substantial amounts in zinc sulfate solutions due to the insolubility of their sulfates. They are seldom present in zinc chloride solutions from which they are easily removed, usually as sulfates. They are likewise removed by addition of hydrofluosilicic acid or fluosilicates to the zinc chloride solutions.

For the removal of the alkali metals from zinc salt solutions I add thereto a soluble hydrofluosilicic acid compound such as the free acid or a water soluble fluosilicate, preferably in an amount substantially equivalent to or in slight excess of the alkali metal content of said solution. The cation of said compound should preferably not introduce a new impurity into the solution or it should be such that it also precipitates an insoluble compound with an anion contained in the zinc salt solution.

If a soluble fluosilicate is used, the cation of which remains in solution, as for instance in the case of heavy metal fluosilicates, this impurity can then be removed subsequently by known methods.

The most convenient fluosilicate which I can use in my purification process is zinc fluosilicate as this will not introduce a new impurity into the solution. I found that zinc fluosilicate ($ZnSiF_6.6H_2O$) is very soluble in water and in zinc salt solutions. This salt can be produced separately and then added to the zinc solution to be purified or I can add hydrofluosilicic acid to the zinc salt solution and neutralize the free acid by addition of a basic zinc compound thereto, such as for instance zinc hydroxide, zinc oxide, zinc carbonate, zinc oxychloride, zinc oxysulfate, etc.

I obtain in this manner from concentrated zinc salt solutions the removal of the total alkali metal salt content thereof down to the limit of the solubility of the alkali metal fluosilicate in the particular solution. The following is an example of my novel process as applied to a concentrated zinc sulfate solution.

To 500 cc. zinc sulfate liquor of 52° Bé. gravity, at 32° C., containing 80 grams of $Na_2SO_4$ per liter, I added a solution containing 90 grams of zinc fluosilicate crystals ($ZnSiF_6.6H_2O$) at around 35° C. The mixture was then agitated thoroughly for about one-half hour. The sodium fluosilicate separated as a flocculent precipitate which was filtered on a suction funnel, washed with a little water, dried and weighed. The recovered fluosilicate analyzed 99.9% pure and was obtained in an amount of 48 grams corresponding to a 90% removal of sodium from the zinc liquor, leaving 10% of the original sodium content in the treated liquor. This corresponded to 8 grams $Na_2SO_4$ per liter or 0.53% on a weight basis.

Entirely similar results are obtained when I add free hydrofluosilicic acid to zinc sulfate or zinc chloride solutions and then neutralize the free acid with a basic zinc compound such as zinc oxide, zinc carbonate, etc.

I claim:

1. The process of purifying an impure technical zinc salt solution containing as an impurity a compound of the alkali and alkaline earth metals which comprises adding zinc fluosilicate to said solution, and separating the precipitate formed from the zinc salt solution.

2. The process of purifying an impure technical zinc sulfate solution containing alkali metal impurities, such as a sodium or potassium compound which comprises adding zinc fluosilicate to said solution, and separating the precipitate formed from the zinc sulfate solution.

3. The process of purifying an impure technical zinc salt solution containing as an impurity a compound of the alkali and alkaline earth metals which comprises adding hydrofluosilicic acid to said solution, neutralizing the free acidity thereof with a basic zinc compound, and separating the precipitate formed from the zinc salt solution.

4. The process of purifying an impure technical zinc sulfate solution containing alkali metal impurities, such as a sodium or potassium compound which comprises adding hydrofluosilicic acid to said solution, neutralizing the free acidity thereof with a basic zinc compound, and separating the precipitate formed from the zinc sulfate solution.

5. The process of purifying an impure technical zinc salt solution containing as an impurity a compound of the alkali and alkaline earth metals which comprises adding hydrofluosilicic acid to said solution, neutralizing the free acidity thereof with zinc oxide, and separating the precipitate formed from the zinc salt solution.

6. The process of purifying an impure technical zinc sulfate solution containing alkali metal impurities, such as a sodium or potassium compound which comprises adding hydrofluosilicic acid to said solution, neutralizing the free acidity thereof with zinc oxide, and separating the precipitate formed from the zinc sulfate solution.

LEON R. WESTBROOK.